(12) United States Patent
Sakurai

(10) Patent No.: US 6,430,004 B1
(45) Date of Patent: Aug. 6, 2002

(54) TAPE CASSETTE REEL-LOCKING SPRING WITH CONNECTION PORTION BENT DOWNWARDLY AT MIDWAY PORTION THEREOF

(75) Inventor: Satoshi Sakurai, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/549,471

(22) Filed: Apr. 14, 2000

(30) Foreign Application Priority Data

Apr. 16, 1999 (JP) .......................................... 11-109823

(51) Int. Cl.[7] .......................................... G11B 23/087
(52) U.S. Cl. .................................... 360/132; 242/343.2
(58) Field of Search ...................... 360/132; 242/343.2, 242/343.1, 343

(56) References Cited

U.S. PATENT DOCUMENTS 5,433,398 A * 7/1995 Sawada ...................... 360/132
5,622,325 A * 4/1997 Taguchi ...................... 242/343

* cited by examiner

Primary Examiner—Craig A. Renner
(74) Attorney, Agent, or Firm—Frommer Lawrence & Haug LLP; William S. Frommer; Matthew K. Ryan

(57) ABSTRACT

An object of the present invention is to offer a tape cassette to secure smooth operation of a reel-locking mechanism, and reliable locking and unlocking of a pair of reels. The invention relates to a tape cassette comprising a pair of reels being accommodated between an upper shell and a lower shell, while a magnetic tape is wound on the reels; a reel-locking main body being movable front and rear relative to the pair of reels, and supported on the lower shell; a pair of reel-locking pieces being swingably supported on the reel-locking main body; and reel-locking springs having a pair of coil portions loosely engaged with the swinging center portions of the pair of reel-locking pieces; and performing locking and unlocking of a pair of reels through engaging and disengaging of the pair of pawl portions with a pair of engaging teeth by movement of the reel-locking main body. Connection portions connecting the pair of coil portions of the reel-locking springs are bent toward the reel-locking main body to press the reel-locking main body by spring force of the connection portions.

2 Claims, 13 Drawing Sheets

FIG. 14
(PRIOR ART)
FIG. 15
(PRIOR ART)
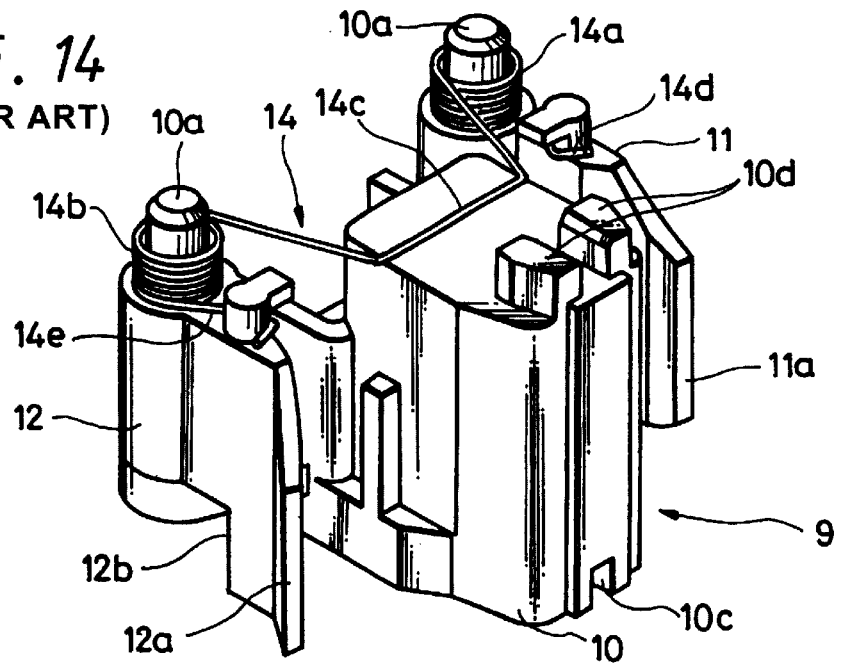
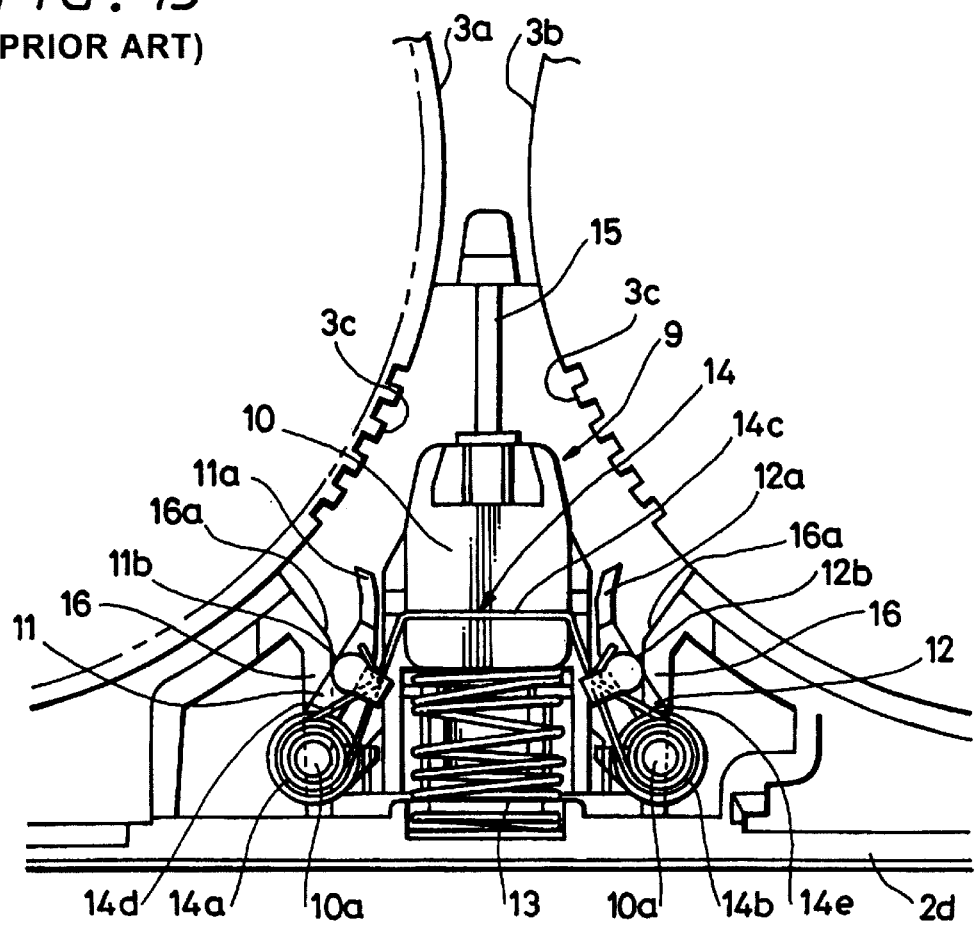

TAPE CASSETTE REEL-LOCKING SPRING WITH CONNECTION PORTION BENT DOWNWARDLY AT MIDWAY PORTION THEREOF

BACKGROUND OF THE INVENTION

1. Field of the Invention

The present invention relates to a tape cassette having a pair of reels, on which a magnetic tape is wound, in a cassette holder, and particularly, to a reel-locking mechanism to lock and unlock a pair of reels by controlling their rotation.

2. Description of the Related Art

A conventional tape cassette used for a device such as a video tape recorder (hereafter, called as VTR), a VTR integrated with a camera, or the like is generally provided with a reel-locking mechanism to control (lock and unlock) rotation of a pair of reels, on which a magnetic tape is wound, when the device is not used. A configurations, shown, for example, in FIG. 13 to 16 has been well known for the reel-locking mechanism of such a tape cassette.

FIG. 13 shows an exploded view of a conventional tape cassette 1 for recording and reproducing. It comprises a cassette housing 2 having a upper shell 2a and a lower shell 2b which are laid superposed one another; a pair of reels 3a, 3b accommodated in the cassette housing 2; a magnetic tape 4 which is fixed at both ends to both the reels 3a, 3b, and wound properly; a reel-locking mechanism 9 to control the rotation of the pair of reel 3a, 3b; and so on. The lower shell 2b of the cassette housing 2 is provided with two hub holes 5a, 5b, in which the pair of supply side reel 3a and take-up side reel 3b are loosely fitted, and on which the reels are rotatably supported.

In addition, the front portion of the cassette housing 2 is provided with a loading opening portion 6 into which the guide pin of the loading mechanism (not shown) and so on enter, and tap inserting holes 7a, 7b open to the outside at both outer sides of the opening portion 6. Guiding portions 8a, 8b to guide the magnetic tape 4 are also installed inside the holes 7a, 7b, respectively. Thus, the tape 4 drawn out from the supply side reel 3a is guided through the tape inserting hole 7a on one outer side to the outside of the cassette housing 2 to cross the loading opening portion 6. And, the tape 4 enters through the tape inserting hole 7b on the other outer side, again, into the cassette housing 2 to be wound around the take-up side reel 3b.

The rear portion of the cassette housing 2 is provided with the reel-locking mechanism 9 disposed opposing almost the midway portion between a pair of reels 3a, 3b. The reel-locking mechanism 9 prevents the slack in the magnetic tape 4 by locking both reels 3a, 3b, when the tape cassette 1 is not used, to stop the rotation of the reels. The reel-locking mechanism 9 comprises a reel-locking main body 10 slidably supported by the lower shell 2b; a pair of reel-locking pieces 11, 12 swingablly provided in the reel-locking main body 10; a spring for sliding 13 to urge the reel-locking main body 10 toward the reels 3a, 3b; and a reel-locking spring 14 to impart spring force to a pair of reel-locking pieces 11, 12.

The reel-locking main body 10 is provided with a pair of axis portions 10a, 10b; the bottom surface with guide grooves 10c; and the top surface with guide bumps 10d. A pair of reel-locking pieces 11, 12 are swingably supported on the pair of axis portions 10a, 10b of the reel-locking main body 10, as shown in FIG. 14. The reel-locking pieces 11, 12 have pawl portions 11a, 12a, respectively and are biased to be always open to the outside by spring force of the reel-locking spring 14.

The reel-locking spring 14 has a configuration where a pair of torsion springs are connected to compose one integrated body. The reel-locking spring 14 has a pair of coil portions 14a, 14b disposed at the right and left sides; a U-shaped connection portion 14c connecting one end of the coil portions 14a, 14b; and spring, pieces 14d, 14e provided at the other end of the respective coil portions 14a, 14b. A pair of coil portions 14a, 14b of the reel-locking spring 14 is loosely engaged with the outside of a pair of axis portions 10a, 10b with which the pair of reel-locking pieces 11, 12 are engaged.

Rotating force in the reel-locking direction is given to the respective reel-locking pieces 11, 12 by engagingly stopping spring pieces 14d, 14e at both right and left ends of the reel-locking spring 14 into the pair of reel-locking pieces 11, 12. At this time, the connection portion 14c of the reel-locking spring 14 is put on the upper surface of the reel-locking main body 10. Elasticity is imparted to the spring pieces 14d, 14e at both ends by connecting right and left coil portions 14a, 14b at the connection portion 14c. Thereby, swing force is given to the pair of reel-locking pieces 11, 12.

The reel-locking mechanism 9 with such a configuration is installed in a predetermined location of the cassette housing 2 as shown in FIG. 15 to control (lock and unlock) rotation of the pair of reels 3a, 3b. The reel-locking main body 10 of the reel-locking mechanism 9 is guided by main body guide ribs 15a, 15b provided in the upper and lower shells 2a, 2b, as shown in FIG. 16, and movably supported in the front to rear direction (perpendicular to the direction connecting the centers of the pair of reels 3a, 3b) of the tape cassette 1. That is, the main body guide rib 15b of the lower shell 2b is engaged with a guide groove 10c of the reel-locking main body 10. The main body guide rib 15a of the upper shell 2a is engaged with the guide projected portion 10d. And, the reel-locking main body 10 is always urged forward by the coil spring 13 one end of which sits in the rear surface of the cassette housing 2.

In addition, on both sides in the left to right direction (direction perpendicular to the front to rear direction) of the main guide ribs 15a, 15b of the cassette 2 are provided a pair of right and left locking piece guide ribs 16, 16 extending in the front to rear direction at a predetermined space. Cam portions 16a, 16a whose tips are made to fan out one another are provided in the inside of the pair of locking pieces guide ribs 16, 16. Contacting portions 11b, 12b of the pair of reel-locking pieces 11,12 urged by spring force of the reel-locking spring 14 come in contact with the cam portions 16a, 16a.

In addition, as shown in FIG. 16, in order to hold the inside of the cassette housing 2 to the light, the upper shell 2a is provided with a window portion 17 formed from colorless transparent plastic material. The upper shell 2a with such the window portion 17 has been generally manufactured by injection molding using a double color die. Such a die has been usually provided with a partition in order to prevent colored opaque resin composing the main body portion of the upper shell 2a from entering into the window portion 17 during manufacturing. The partition forms a concave portion 17a in the upper shell 2a.

The operation of the reel-locking mechanism having the above configuration will be described below. FIG. 15 describes the reel-locking mechanism 9, and shows a state that the tape cassette 1 is loaded to a cassette deck (not shown). In this case, when the tape cassette 1 is loaded to the cassette deck, and a reel-unlocking member 18 (See FIG. 16) provided in the cassette deck enters into the reel-locking main body 10. As a result, the reel-locking main body 10 is moved backward (the rear side of the cassette deck 1) against spring force of the coil spring 13.

Therewith, the pair of reel-locking pieces 11, 12 are respectively guided by the cam portions 16a of the locking piece guide ribs 16 to be swung toward the reel-locking main body 10 against the spring force of the reel-locking spring 14. Thereby, the pawl portions 11a, 12a of the pair of reel-locking pieces 11, 12 are respectively disengaged with the engaging teeth 3c, 3c of the pair of reels 3a, 3b with the result that the locking of the pair of reels 3a, 3b is released. As a result, it becomes possible for both the reels to rotate, and the magnetic tape 4 is wound from the one reel to the other reel by the rotation of a pair of reel bases (not shown) installed to both the reels 3a, 3a.

On the other hand, though not illustrated, when the tape cassette 1 is not used (a state of being taken out from the cassette deck), the reel-locking main body 10 is urged forward by spring force of the sliding spring 13. Concurrently, being urged by spring force of the reel-locking spring 14, the pawl portions 11a, 12a of the pair of reel-locking pieces 11, 12 are opened outward. And, the pair of pawl portions 11a, 12a are engagingly stopped by the engaging teeth 3c, 3c of the pair of the reels 3a, 3b with the result that the pair of reels 3a, 3b is placed in a state of being locked. As a result, the rotation of both reels 3a, 3b is prevented, thereby generating no slack in the magnetic tape 4 in the circumstances.

However, the upper shell 2a of the above conventional tape cassette has been formed by two colors molding. When manufacturing the upper shell 2a, the concave portion 17a is provided to form a partition in order to prevent resin composing the main body from entering into the window portion 17. The reel-locking spring 14 of the reel-locking mechanism 9 is formed near the concave portion 17a. Thereby, at a time of the tape cassette 1 being taken out of the cassette deck, when the reel-locking main body 10 is moved forward by spring force of the coil spring 13, the connection portion 14c of the reel-locking spring 14 tends to be easily caught in the concave portion 17a.

As a consequence, when the connection portion 14c of the reel-locking spring 14 gets caught in the concave portion 17a to come to a standstill, since the reel-locking main body 10 to which the reel-locking spring 14 is fit is unable to move forward to the predetermined position, it becomes impossible for the pawl portions 11a, 12a of the pair of reel-locking pieces 11, 12 to respectively engage with the engaging teeth 3c, 3c of the pair of reels 3a, 3b, and rotation of both reels 3a, 3b comes to be unable to be stopped. As a result, since the pair of reels 3a, 3b are kept in a state capable of rotating, when vibration and impact by falling are applied to the tape cassette 1, there is a possibility that too much slack in the tape is generated by free rotation of the pair of reels 3a, 3b, for example. Consequently, there has been a problem that too much slack in the magnetic tape 4 of the tape cassette 1 causes a fear of the magnetic tape 4 being entangled at the time of loading the magnetic tape 4 to the cassette deck 1.

SUMMARY OF THE INVENTION

The present invention is made to solve the above problem, and an object of the invention is to provide a tape cassette which ensures smooth operation of a reel-locking mechanism, and reliable locking and unlocking of a pair of reels.

In order to solve the above problem or the like and achieve the above object, the present invention is a tape cassette comprising; a pair of reels which are accommodated between an upper shell and a lower shell superposed each other with a magnetic tape in a state of being wound on the reels, and have engaging teeth respectively; a reel-locking main body which is movable forward and backward relative to the pair of reels, and supported by the lower shell; a pair of reel-locking pieces swingably supported on the reel-locking main body, and having pawl portions at the tip respectively; and a reel-locking spring having a pair of coil portions loosely fit to swinging center portions of pair of reel-locking pieces, and urging the pair of pawl portions toward the pair of reels, respectively; the cassette performing locking and unlocking of the pair of reels through engagement and disengagement of the pair of pawl portions with/from the pair of engaging teeth by movement of reel-locking main body, characterized in that a connection portion connecting the pair of coil portions of the reel-locking spring is bent toward the reel-locking main body to press the reel-locking main body by spring force of the connection portions.

By the above configuration of the present invention, the connection portions connecting the pair of coil portions of the reel-locking spring is bent toward the reel-locking main body to press the reel-locking main body by the spring force of the connection portion. Thereby, when the tape cassette is taken out of the cassette deck, it is possible to do away with the fear of the connection portion of the reel-locking spring of the reel-locking mechanism being caught in the concave portion of the upper shell and also, it is possible to ensure smooth and reliable reel-locking operation, and there may be no slack in the magnetic tape.

BRIEF DESCRIPTION OF THE DRAWINGS

FIG. 9A shows that a reel-locking spring is installed in the reel-locking main body. FIG. 9B shows that a stopper on a pawl rests on a stopper on the main body by swinging a reel-locking piece. FIG. 9C shows that the stopper on the pawl passes over the stopper on the main body by swinging of the reel-locking piece;

FIG. 14 is a perspective view of an external appearance of a reel-locking mechanism of the conventional tape cassette;

FIG. 15 is a view of a reel-locking mechanism of the conventional tape cassette in a reel-unlocked state.

DETAILED DESCRIPTION OF THE PREFERRED EMBODIMENTS

Figure 1:
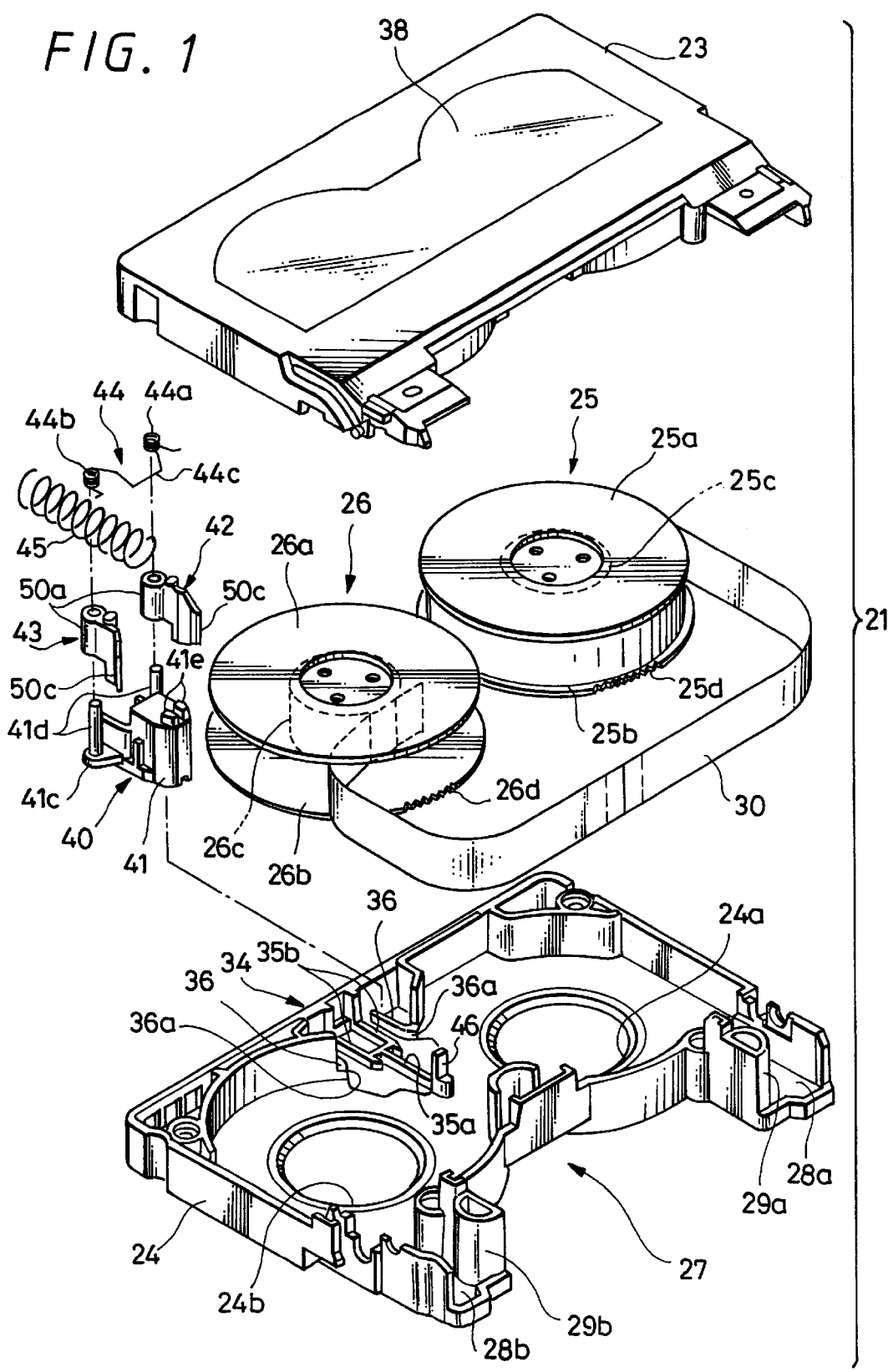
FIG. 1 is an exploded perspective view of one embodiment of a tape cassette according to the present invention.
Figure 2:
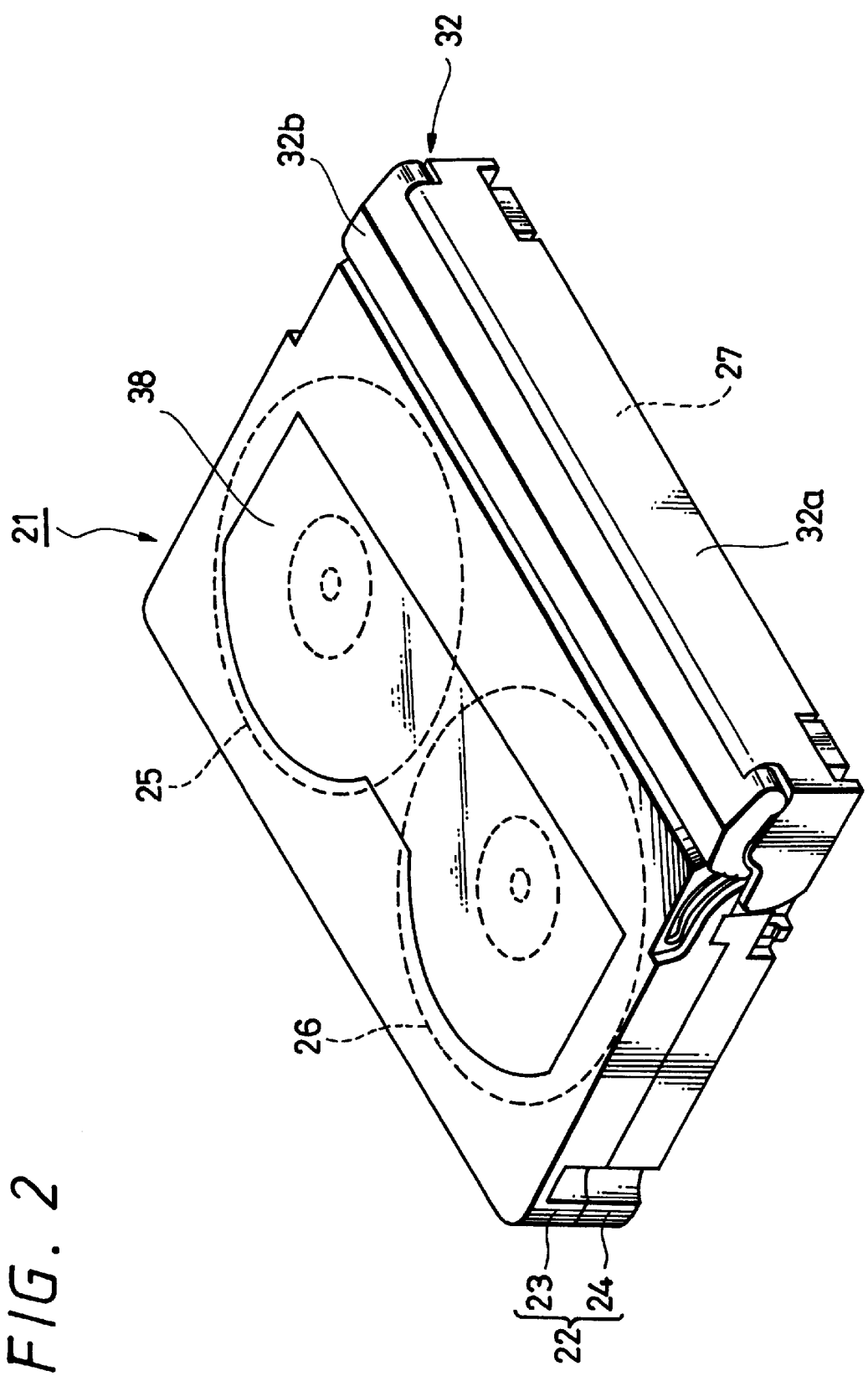
FIG. 2 is a perspective view of an external appearance of the assembled tape cassette shown in FIG. 1.
Figure 3:
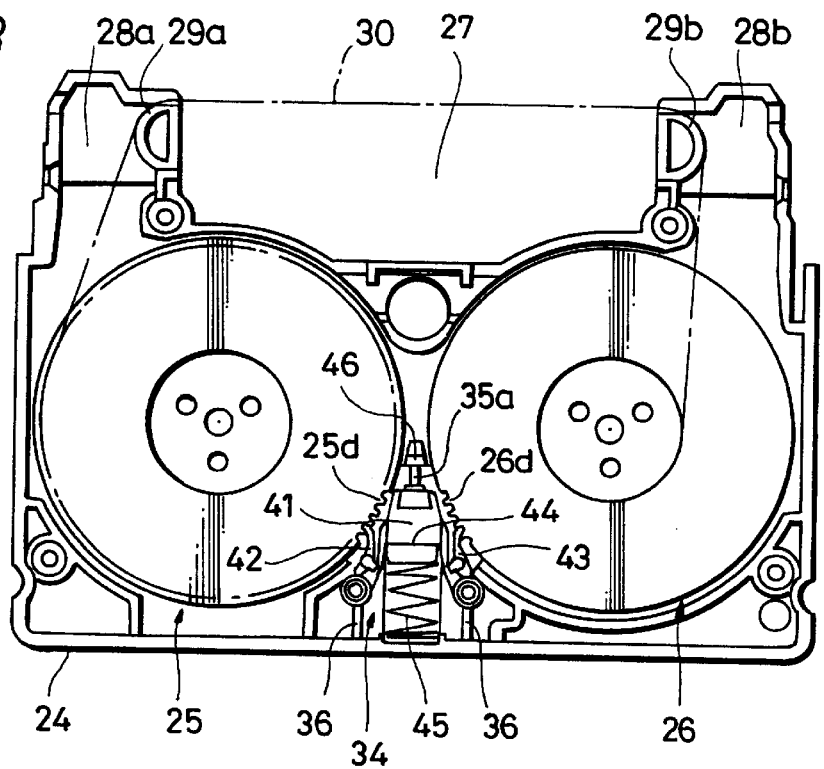
FIG. 3 is a plan view of a lower shell of the tape cassette shown in FIG. 1 after removal of an upper shell.
Figure 4:
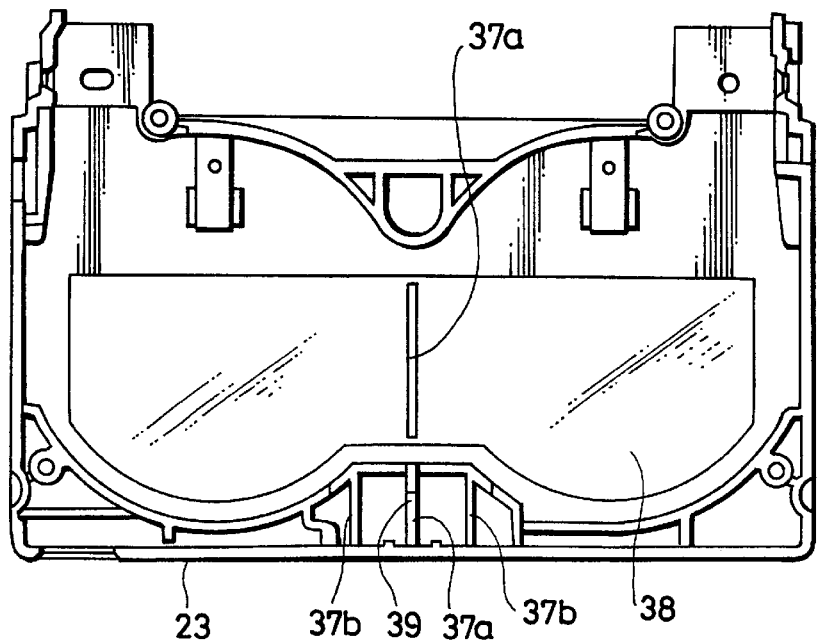
FIG. 4 is a bottom view of the upper shell of the tape cassette shown in FIG. 1.
Figure 5:
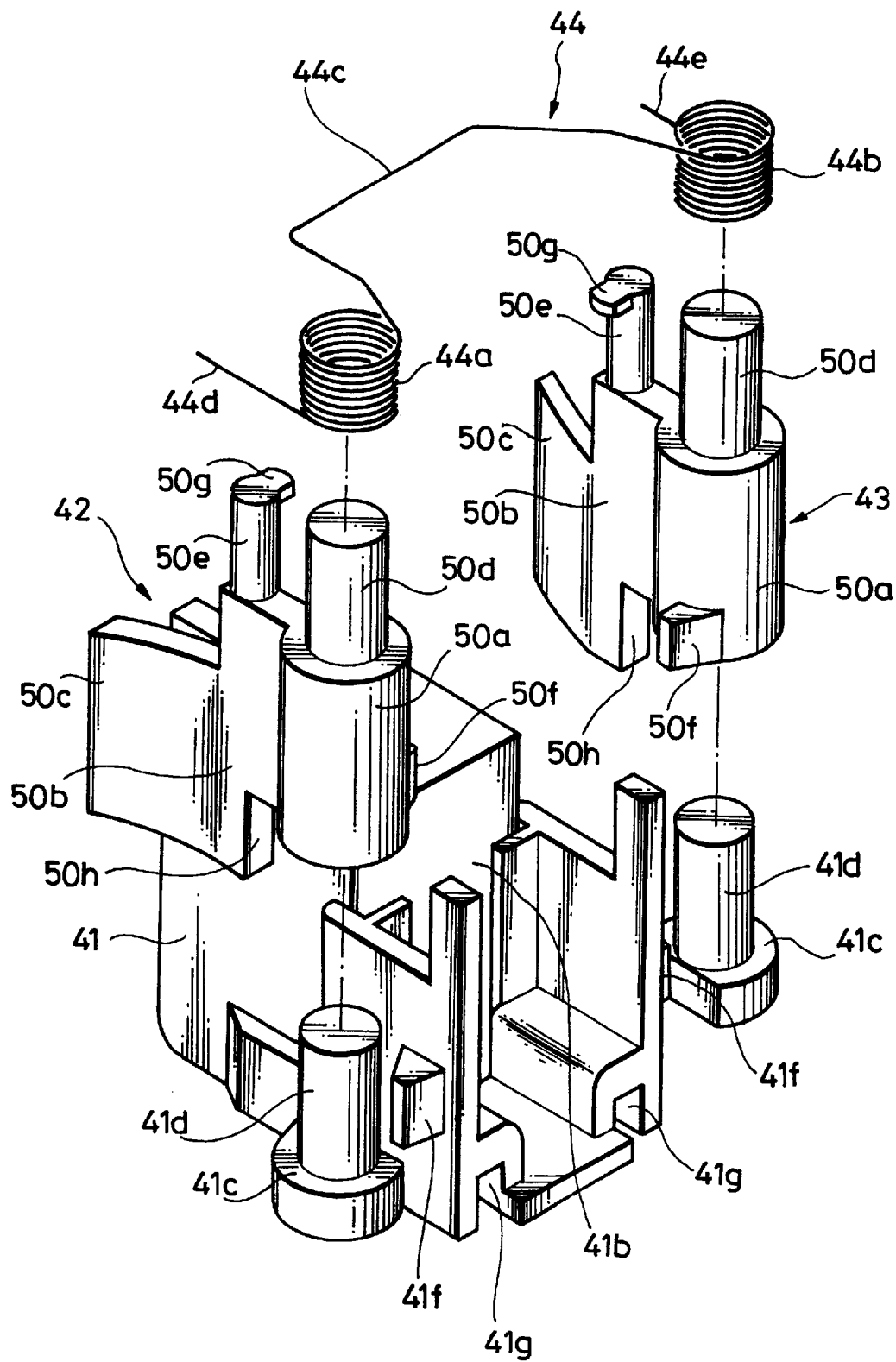
FIG. 5 is an exploded perspective view of a reel-locking mechanism of the tape cassette according to the present invention.
Figure 6:
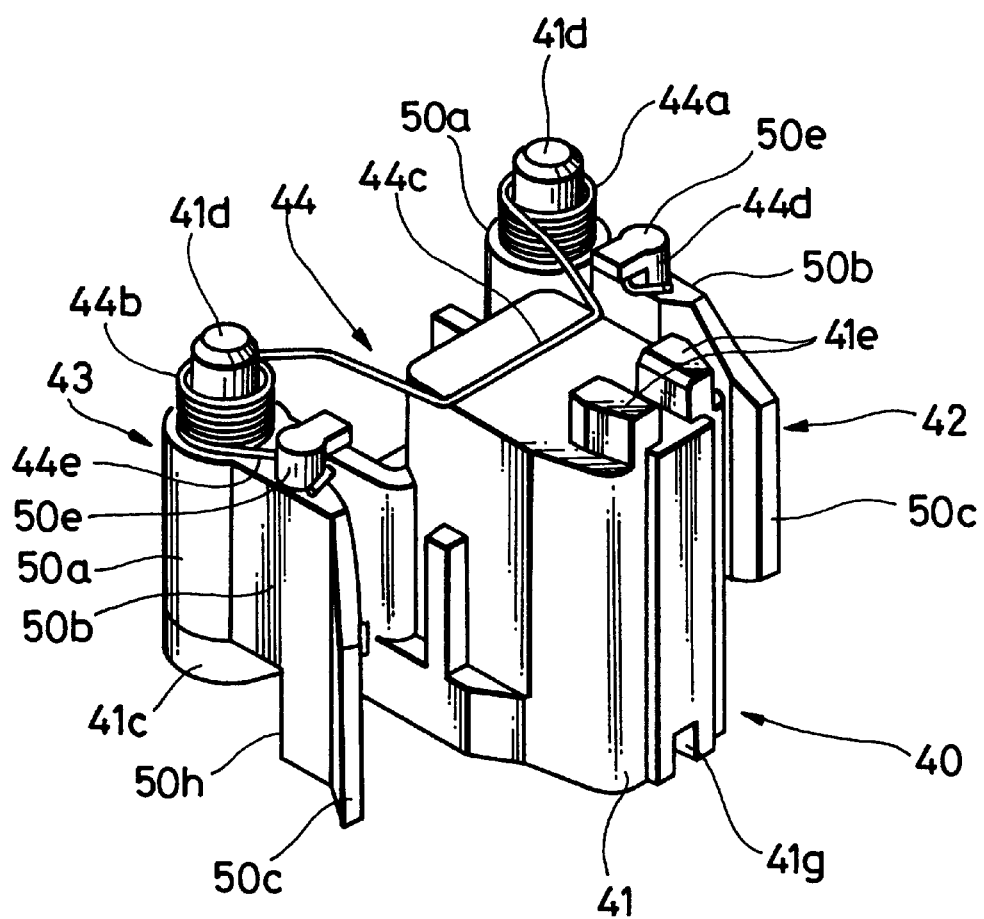
FIG. 6 is a perspective view of an external appearance of the reel-locking mechanism of the assembled tape cassette according to the present invention.
Figure 7:
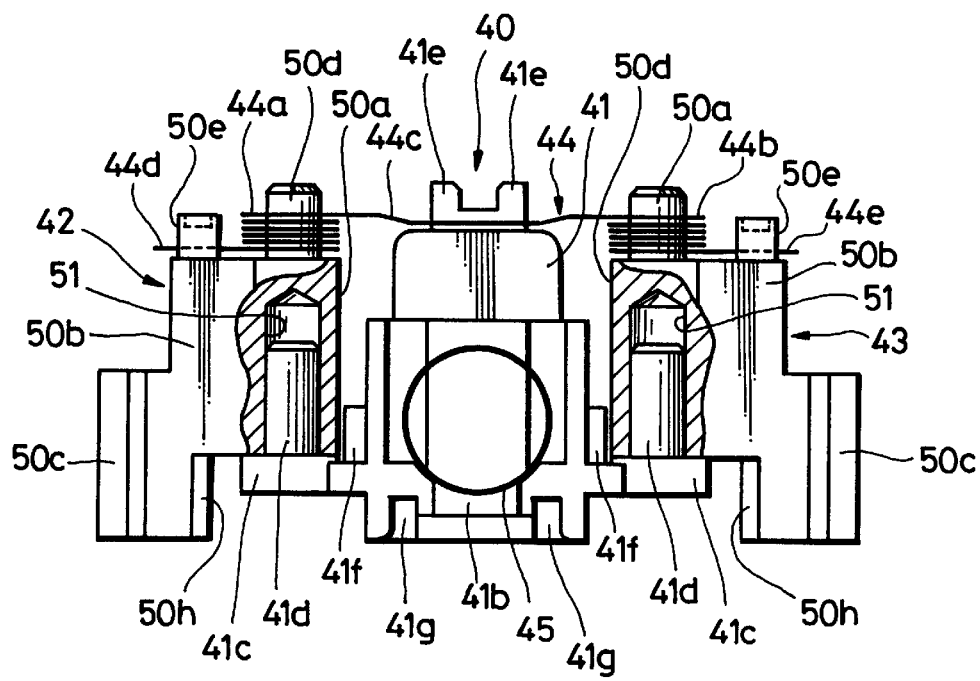
FIG. 7 is a rear section view of a portion of the reel-locking mechanism of the tape cassette according to the present invention.
Figure 8:
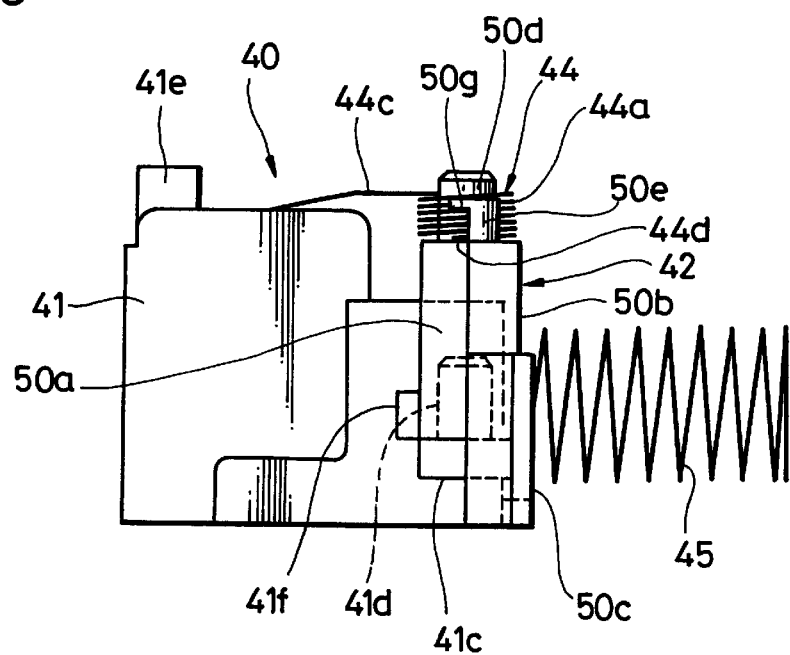
FIG. 8 is a side view of the reel-locking mechanism of the tape cassette according to the present invention.
Figure 9:
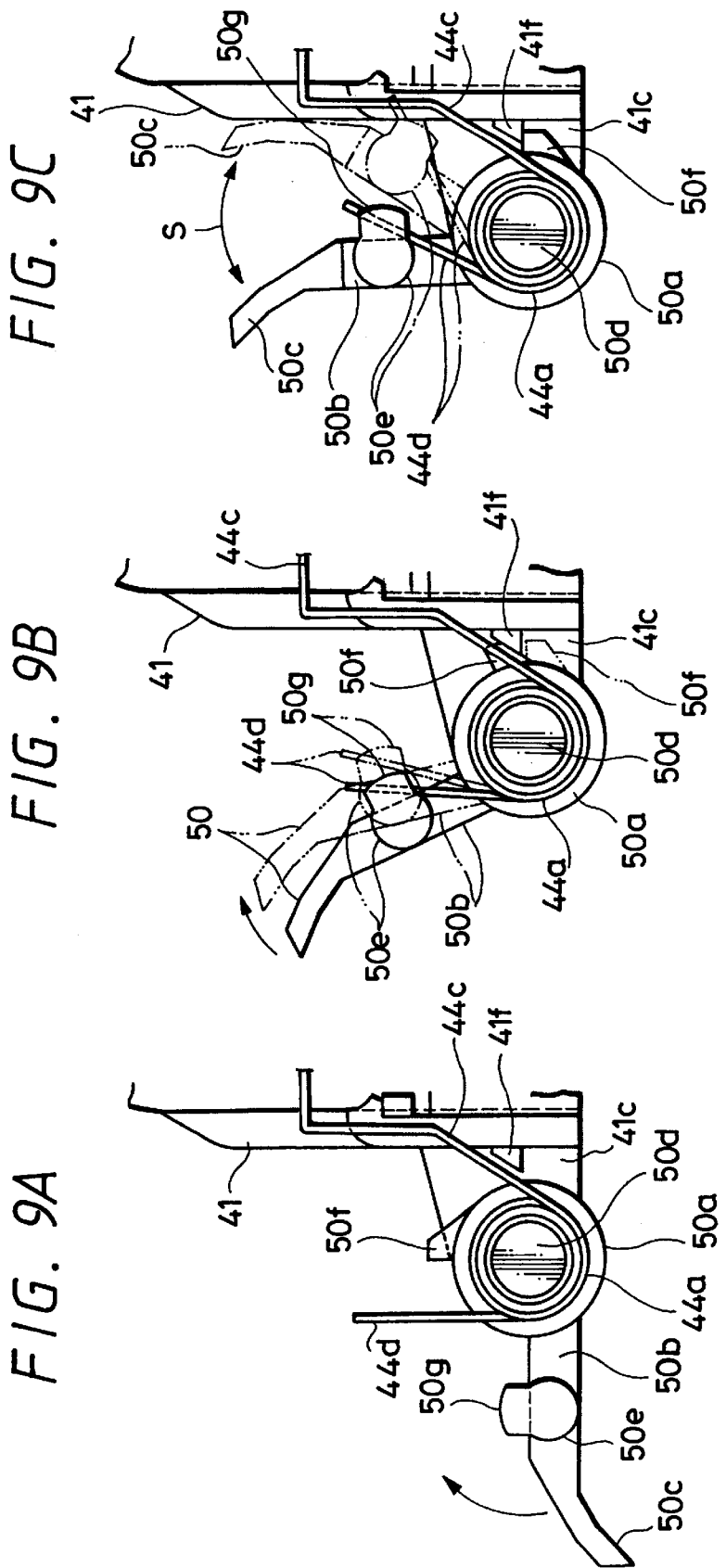
FIGS. 9A, 9B, and 9C describe an assembling process of the reel-locking mechanism of the tape cassette according to the present invention.
Figure 10:
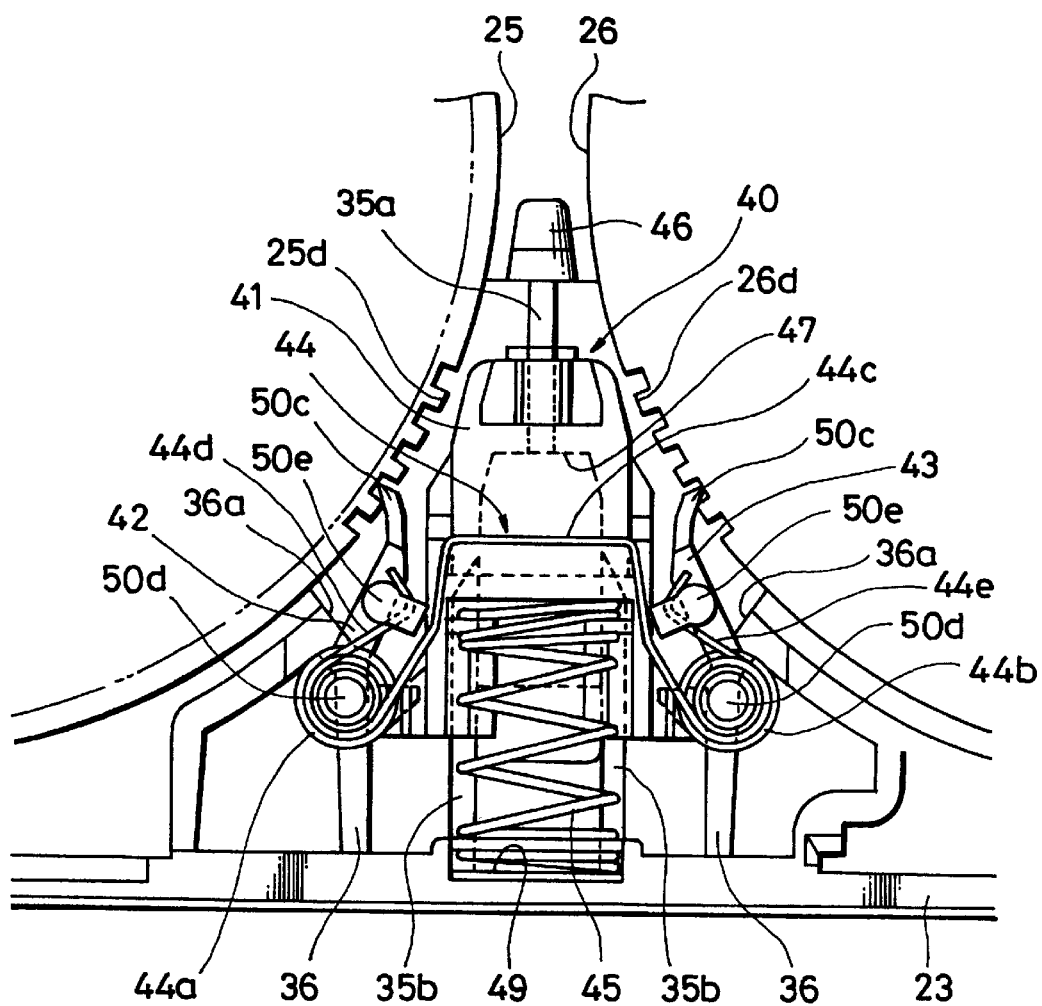
FIG. 10 is a view of the reel-locking mechanism of the tape cassette according to the present invention in a reel-locked state.
Figure 11:
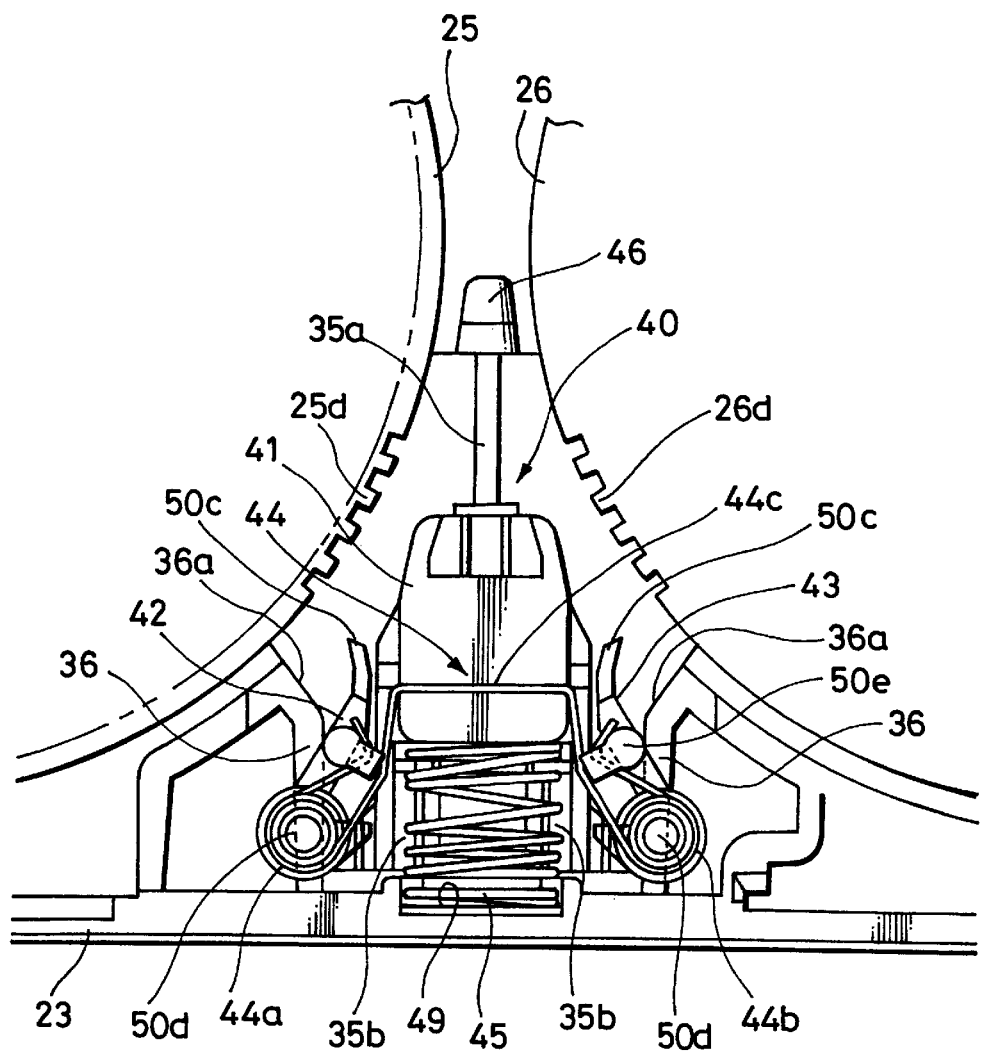
FIG. 11 is a view of the reel-locking mechanism of the tape cassette according to the present invention in a reel-unlocked state.
Figure 12:
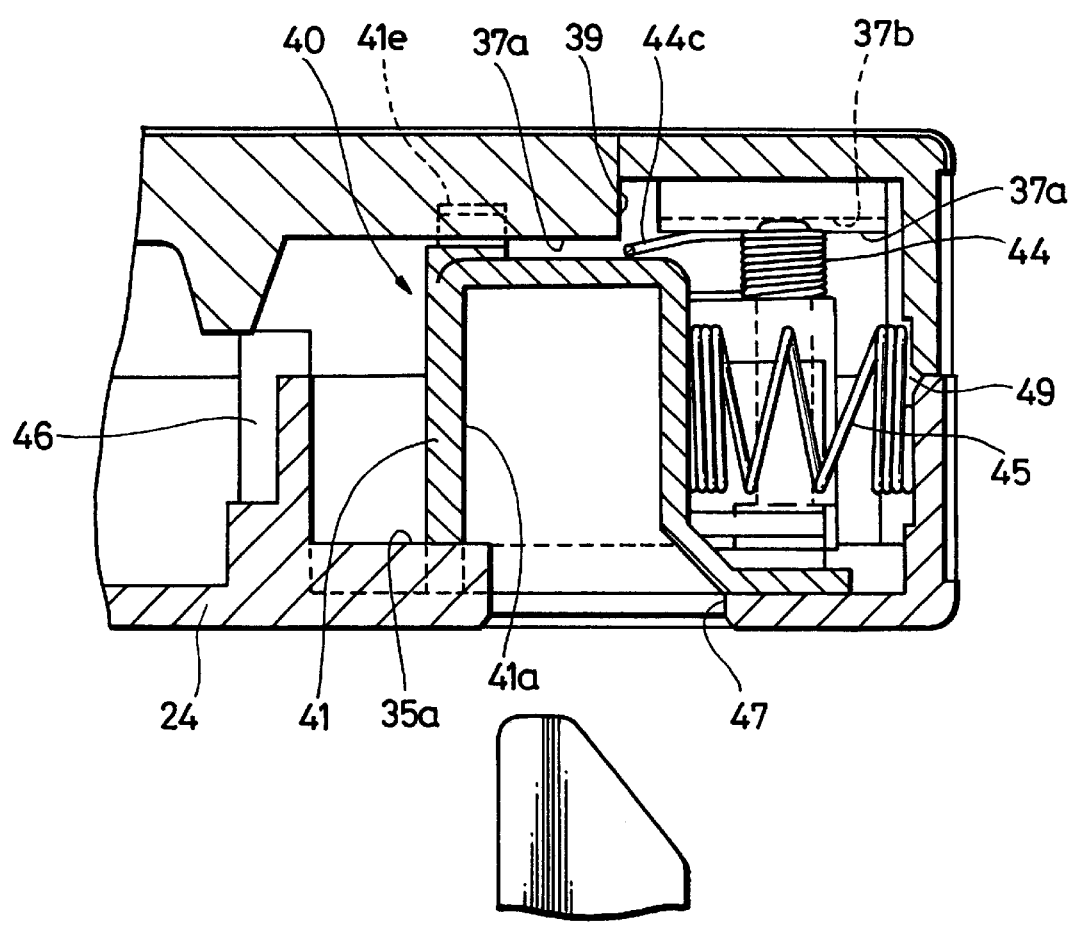
FIG. 12 is a section view of the reel-locking mechanism of the tape cassette according to the present invention.
Figure 13:
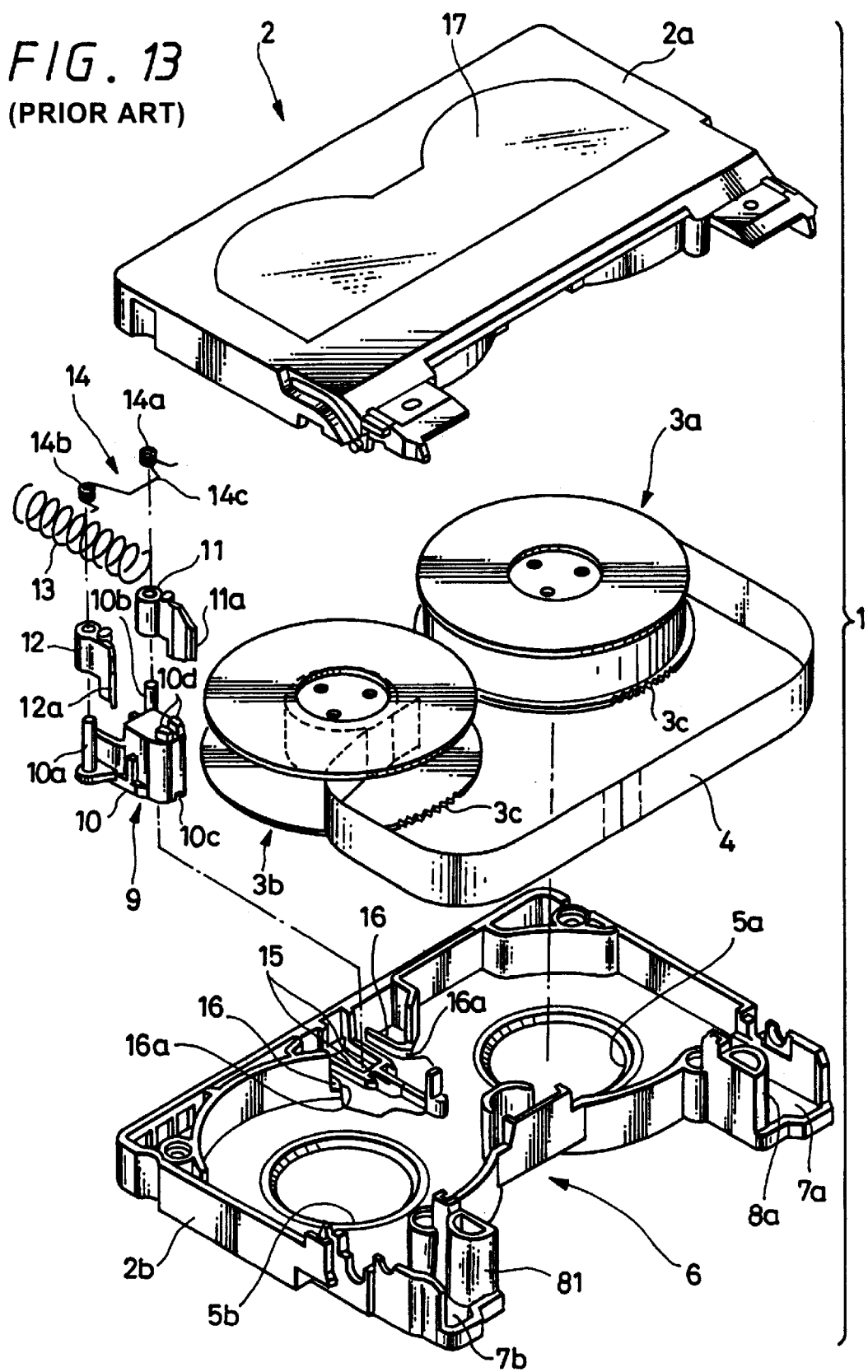
FIG. 13 is an exploded perspective view of a conventional tape cassette.
Figure 16:
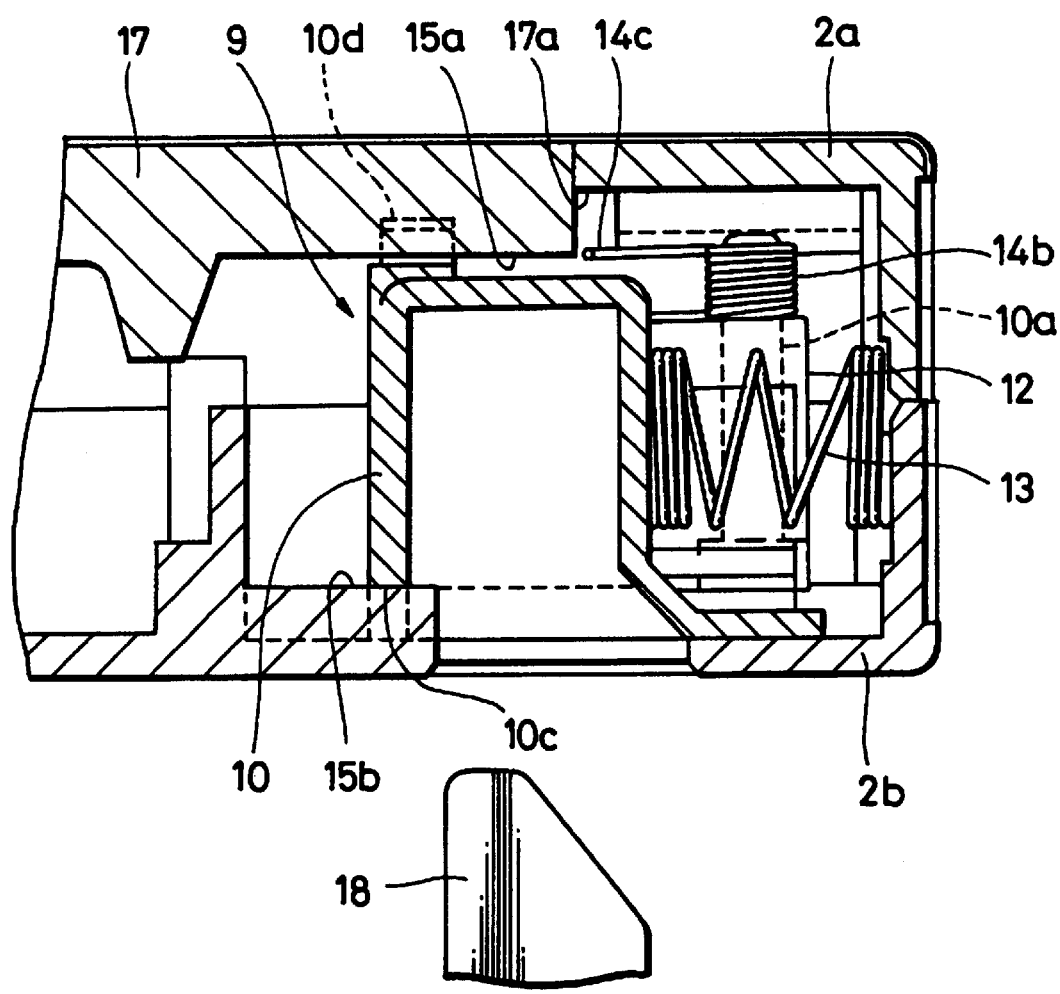
FIG. 16 is a section view of the reel-locking mechanism of the conventional tape cassette.

One embodiment of the present invention will be described below with reference to the attached drawings. FIGS. 1 to 12 show one embodiment of the present invention, wherein the invention is applied to a tape cassette for recording and reproductions of digital VTR for a consumer product. FIG. 1 shows an exploded perspective view of the tape cassette; FIG. 2 a perspective view of the external appearance of the tape cassette; FIG. 3 a plan view of the lower shell of the tape cassette; FIG. 4 a bottom view of the upper shell of the tape cassette; FIG. 5 an exploded perspective and rear view of the reel-locking mechanism of the tape cassette; FIG. 6 a perspective and front view of the reel-locking mechanism of the tape cassette; FIG. 7 a rear view of the section of a portion of the reel-locking mechanism of the tape cassette; FIG. 8 a side view of the reel-locking mechanism of the tape cassette; FIGS. 9A, 9B, and 9C operation views of the reel-locking piece of the reel-locking mechanism of the tape cassette; FIG. 10 a view of a state where the reels are locked by the reel-locking mechanism of the tape cassette; FIG. 11 a view of a state where the reels are unlocked by the reel-locking mechanism of the tape cassette; FIG. 12 a section view of he reel-locking mechanism of the tape cassette.

The tape cassette 21 according to this embodiment is provided with a cassette housing 22 formed by synthetic resin with suitable rigidity such as polypropylene (PP), acrylonitrile-butadiene-styrene copolymer (ABS), or high-impact polystyrene (HIPS). The cassette housing 22 has an upper shell 23, and a lower shell 24, wherein the upper one is put on top of the lower one. Two hub holes 24a, 24b are provided on the lower shell 24 of the cassette housing 22 at a predetermined space. The hubs of a pair of reels, a supply side reel 25 and a take-up side reel 26, are loosely fitted in the hub holes 24a and 24b, and are rotatably supported.

Both supply and take-up side reels 25 and 26 have upper plates 25a, 26a, lower plates 25b, 26b, and roll core portions 25c, 26c respectively. And, the roll core portions 25c, 26c are assembled to be held between the upper plates 25a, 26a, and the lower plates 25b, 26b, respectively, in such a manner that the supply side reel 25 and the take-up side reel 26 are integrated into one body, respectively. One end of a magnetic tape 30 is fixed to the roll core portion 25c of the supply side reel 25, and the other end of the tape 30 is fixed to the roll core portion 26c of the take-up side reel 26. A predetermined volume of the tape 30 while being taken up in the supply side reel 25 is stored in the case 22. Moreover, a plurality of ratchet-state engaging teeth 25d, 26d are provided at an equal distance on peripheries of the lower plate 25b, 26b in the circumference direction.

In addition, at the front portion of the cassette housing 22, there are provided a loading opening portion 27 into which a component such as a guide pin of a loading mechanism of a cassette deck (not shown) enters, and tape inserting holes 28a, 28b open to both the outside of the opening portion 27. Guiding portions 29a, 29b to guide the magnetic tape 30 are also installed inside the holes 28a, 28b, respectively. Thus, the tape 30 drawn out from the supply side reel 25 is guided through the tape inserting hole 28a on one outer side to the outside of the cassette housing 22 to cross the loading opening portion 27. And, the tape 30 enters through the tape inserting hole 28b on the other outer side, again, into the cassette housing 22 to be wound onto the take-up side reel 26.

As shown in FIG. 2, at the front portion of the cassette housing 22, there is installed a lid 32 to open and cover the opening portion 27 and the tape inserting holes 28a, 28b on the right and left sides of the opening portion. The lid 32, comprising three sheets of lid members, protects the magnetic tape 30 crossing the opening portion 27 of the cassette housing 22 in a wrapping manner.

That is, the lid 32 comprises a front lid 32a covering the front side of the magnetic tape 30, a top lid 32b covering the upper side of the magnetic tape 30, and a back lid (not shown) covering the rear side of the magnetic tape 30. The front lid 32a is swingably supported by the cassette housing 22, and one end of the top lid 32b and that of the back lid are swingably connected to the front lid 32a. The other end of the top lid 32b is slidably supported on the upper shell 23, and that of the back lid is slidably supported by the lower shell 24.

A reel-locking space 34 to receive the reel-locking mechanism 40 is installed in the central portion on the back side of the cassette housing 22 as shown in FIG. 3. The reel-locking space 34 has a guide rib 35 for the main body and guide ribs 36, 36 for a pair of locking pieces installed in the lower shell 24 (See FIG. 1 and FIG. 3), and main body guide ribs 37a and 37b, 37b installed in the upper shell 23 (See FIG. 4). The lower main body guide rib 35a and the upper main body guide rib 37a are configured to be facing each other, and formed to extend by a predetermined length in the front to rear direction perpendicularly intersecting the direction (right to left direction) connecting the centers of a pair of reels 25, 26 accommodated in the cassette housing 22.

A pair of locking piece guide ribs 36, 36 are provided to extend in the front to rear direction at a predetermined space in the right to left direction relative to the main body guide rib 35a, 35b in the lower shell 24. Cam portions 36a, 36a with the tip side respectively made to fan out are provided inside the pair of locking piece guide ribs 36, 36. The upper shell 23 and lower shell 24 constituting the cassette housing 22 wherein such reel-locking space 34 is provided are manufactured, for example, as follows.

Colored opaque resin (in general, black plastic material) is used for the lower shell 24, as there is no need to hold the inside to the light. The shell 24 is manufactured by way of injection molding by an injection molding machine using a single color molding die. On the other hand, a window portion 38 formed from colorless transparent plastic material is provided in a portion of the main body of the upper housing 23 in order to hold the inside of the housing 22 to the light.

The upper shell 23 with such a window portion 38 has been usually manufactured by way of injection molding using a two color molding die. When manufacturing the upper shell 23, a partition is provided in this kind of a conventional die in order to prevent colored opaque resin composing the main body of the upper shell 23 from entering into the window portion 38. The partition causes formation of a concave portion 39 in the upper shell 23, as shown in FIG. 12 by notching a portion of the main body guide rib 37a.

There is no problem with the concave portion 39 when the window portion 38 is small and is located away from the reel-locking mechanism 40. However, when the window portion 38 is made as large as possible like in this embodiment, it translates into the concave portion 39 being formed near the reel-locking mechanism 40. The present invention is suitable for a cassette housing 22 with such the large window portion 38.

The reel-locking mechanism 40 applied to such a cassette housing 22 has a configuration shown in FIGS. 5 to 12. That is, the reel-locking mechanism 40 comprises a reel-locking main body 41, a pair of reel rocking pieces 42, 43, a reel rocking spring 44, and a sliding spring 45, as shown in FIG. 5.

The reel blocking main body 41 comprises a sliding operation portion 41a (See FIG. 12) having an opening toward the bottom, a spring retaining portion 41b for engaging with and retaining the front end portion of the sliding spring 45 to urge the reel-locking main body 41 to the front side, a pair of bracket portions 41c, 41c protruding to both sides in the right to left direction, a pair of axis portions 41d, 41d provided to protrude from each of bracket portions 41c, 41c to the upper side, and a pair of guide bumps 41e, 41e. On both sides of the reel-locking main body 41 are provided main body side stoppers 41f in a manner of opposing each of the axis portions 41d.

Main body guide ribs 37a of the above upper shell 23 are slidably engaged with a pair of guide bumps 41e, 41e. Moreover, a plurality of guide grooves 41g, 41g extending forward and backward are provided on the lower surface of the reel-locking main body 41. By engaging the guide grooves 41g, 41g with the main body guide ribs 35a, 35b provided in the lower shell 24, and slidably sandwiching the main body guide ribs 35a with the pair of the guide bumps, the reel-locking main body 41 is supported to linearly move in the front to back direction. The forward movement of the reel-locking main body 41 is limited by the guide stopper 46 provided at the tip of the main body guide rib 35a.

Corresponding to the sliding operation portion 41a of the reel-locking main body 41, an operation window portion 47 extending from the rear end portion of the main body guide rib 35a to the back side is opened in the lower shell 24. The operation window portion 47 is provided in the lower shell 24 to operate the reel-locking main body 41 in the front to rear direction. The slide operation portion 41a is faced with the upper portion of the operation window portion 47. Thus, when a tape cassette 21 is loaded to a cassette deck, a reel-unlocking member 48 of the cassette deck is inserted to the sliding operation portion 41a through the operation window portion 47. By inserting the reel unlocking member 48, the reel-locking main body 41 moves backward against the spring force of the sliding spring 45 to release the locking by the reel-locking mechanism 40.

As shown in FIGS. 10 to 12, the front end portion of the sliding spring 45 consisting of a compression coil is engagingly retained in the spring retaining portion 41b of the reel-locking main body 41. The rear end portion of the sliding spring 45 is engagingly retained in the spring retaining portion 49 provided in the lower shell 24. The reel-locking main body 41 is always urged by the spring force of the coil spring 45 to the front side so as to approach closer to a pair of reels 25, 26.

As shown in the figures such as FIG. 5 and FIG. 6 or the like, two torsion springs are integrated into one body to compose the reel-locking spring 44 of the reel-locking mechanism 40. That is, the reel-locking mechanism 44 comprises two coil portions 44a, 44b having any suitable numbers of turns of wire; an arm-like connection portion 44c connected to both coil portions 44a, 44b at one end of each of the coil portions 44a, 44b; and spring pieces 44d, 44e connected to the other end of each of the coil portions 44a, 44b, respectively. Two coil portions 44a, 44b are wound in the directions opposite to each other to generate spring force opposite to each other (In this embodiment, the coil portion 44a located at the left is left-handed; and the coil portion 44b at the right-handed, in the figures such as FIG. 10 and the like).

The connection portion 44c connecting two coil portions 44a, 44b are configured to protrude forward by being formed into a U-letter shape. In addition, the portion 44c is further bent downward midway, as shown in the figures such as FIG. 12. Thereby, the portion 44c is provided with high elasticity to press the upper surface of the reel-locking main body 41. The distance between two coil portions 44a, 44b is set to almost the same as the length between a pair of axis portions 41d, 41d of the reel-locking main body 41.

As shown in the figures such as FIGS. 5 to 9, a pair of reel-locking pieces 42, 43 comprises a cylinder portion 50a having a fit hole 51 which fits swingably in the axis portion 41d of the reel-locking main body 41, an arm portion 50b contiguous with the side portion of the cylinder portion 50a, a pawl portion 50c contiguous with the tip end of the arm portion 50b, and an axis portion 50d protruding from the upper end of the cylinder portion 50a, a spring hitching pin 50e protruding from the arm portion 50b, and a pawl side stopper 50f protruding from the inside of the cylinder portion 50a.

The axis portions 50d of the reel-locking pieces 42, 43 and the engaging hole 51 of the cylinder portion 50a are configured in a concentric manner. The pawl side stopper 50f is disposed almost perpendicular to the arm portion 50b. The pawl portion 50c extends in an opposing direction to that of the pawl side stopper 50f. An overhang piece 50g is provided on the upper end of the spring hitching pin 50e in order to prevent the spring pieces 44d, 44e of the reel-locking spring 44 from coining out. A contacting portion 50h for contacting with the cam portion 36a of the locking piece guide tab 36 provided in the lower shell 24 is provided in the lower portion of the arm portion 50b.

The reel-locking mechanism 40 with such a configuration may be easily assembled as follows, for example, as shown in FIGS. 9A to 9C. Since the assembling of the pair of reel-locking pieces 42, 43 are the same operations of right to left symmetry, description will be made of only the left half by illustrating it in FIGS. 9A to C.

Firstly, the right and left axis portions 41d, 41d of the reel-locking main body 4 are respectively inserted into the fit holes 51 of the reel-locking pieces 42, 43 which are attached to the corresponding side thereof, and the pieces 42, 43 are swingably supported on both sides of the main body 41. In this case, the pawl portions 50c of the reel-locking pieces 42, 43 are installed in ways they face outside, respectively. That is, the left reel-locking piece 42 is assembled to the left side of the main body 41, and the right reel-locking piece 43 is assembled to the right side of the main body 41.

Secondly, as shown in FIG. 9A, with the pawl portion 50c of each reel-locking piece 42, 43 in the state of being directed outside, two coil portions 44a, 44b of the reel-locking spring 44 are fit into the axis portions 50d, 50d of the reel-locking pieces 42, 43 from the spring pieces 44d, 44e sides, wherein the tip portion of the connection portion 44c of the reel-locking spring 44 is pressed on the upper surface of the main body 41. And, since the distance between the right and left axis portions 50d, 50d is almost the same as that between two coil portions 44a, 44b, the reel-locking spring 44 may be mounted onto the reel-locking pieces 42, 43 without any torsion being applied to the coil portions 44a, 44b, and in a free state.

Then, while the right and left reel-locking pieces 42, 43 are simultaneously held from the front side of the reel-locking main body 41, the arm portion 50b and the pawl portion 50c are swung forward around the axis portion 41d, as shown in FIG. 9A. That is, the left reel-locking piece 42 is swung clockwise, as shown in the figure, and the right piece 43 (not shown) counterclockwise.

Thus, the swinging of the piece 42 (or 43) causes the spring hitching pin 50e provided on the arm portion 50b to be in contact with the spring piece 44d (or 44e) of the reel-locking spring 44, as shown in FIG. 9B. And further swinging produces torsion of the coil portion 44a (or, 44b) in accordance with an increasing amount of the swinging, and the urging force of the spring piece 44d (or, 44e) increases. And, after the spring holding pin 50e comes in contact with the spring piece 44d (or, 44e), the rear surface of the stopper on the pawl 50f provided inside the cylinder portion 50a rests on the front surface of the main body stopper 41f provided on the side of the main body 41 by further predetermined swinging of the reel-locking piece 42 (or, 43).

Swinging of the reel-locking piece 42 (or, 43) by further adding force generates deflection in the main body stopper 41f, the pawl side stopper 50f, and axis portion 41d. Thereby, the pawl side stopper 50f jumps over the main body stopper 41f to move to the back side, as shown by an alternate long and two short dashes line in FIG. 9B. In this case, it is comparatively easy to jump over both the stoppers 41f, 50f due to the fact that the rear surface of the pawl stopper 50f and the front surface of the main side stopper 41f are tapered.

Thereafter, removal of the swinging force of the right and left reel-locking pieces 42, 43 causes reverse swinging of both reel-locking pieces 42, 43 by dint of the swinging force of the spring piece 44d (or, 44e). And the front surface of the pawl stopper 50f rests on the rear surface of the main body stopper 41f. Engagement of the pawl stopper 50f with the main body stopper 41f generates spring force at the reel-locking spring 44 to urge the pawl portions 50c, 50c outward by the spring pieces 44d, 44e at both ends, respectively. The urging force of the spring piece 44d (44e) is not so large as to have the pawl stopper 50f jump over the main body stopper 41f, and the engagement between both stoppers 41f and 50f prevents the return swinging, and a pair of reel-locking piece 42, 43 are kept in the state shown in FIG. 9C.

Thereby, the assembly of the reel-locking mechanism 40 according to this embodiment is completed. That is, the assembling is completed only by pinching and inwardly swinging both reel-locking pieces 42, 43 to each other after placing the reel-locking spring 44 on the right and left reel-locking pieces 42, 43 inserted into the reel-locking main body 41. Accordingly, the reel-locking mechanism 40 may be very easily assembled.

The reel-locking mechanism 40 assembled as described above can undergo swinging displacement within the range from the state where the pawl stopper 50f rests on the main body stopper 41f as shown by a solid line in FIG. 9C to the state where the pawl portion 50c is pressed inward and rests on the side of the reel-locking main body 41 as shown by the alternate long and two short dot line. The swinging range of the reel-locking pieces 42, 43 is a usual operational range S in the reel-locking mechanism 40. In the usual operational range S, the right and left reel-locking pieces 42, 43 are urged outward by spring force of the reel-locking spring 44, respectively, and adding inward force against the spring force of the reel-locking spring 44 causes the reel-locking piece 42, 43 to swing and in accordance with the amount of its force, each of the pawl portion 50c, 50c undergoes swinging displacement inwardly.

As the reel-locking mechanism 40 is accommodated in the reel-locking space 34 of the cassette housing 22, the right and left reel-locking pieces 42, 43 with the pawl portion 50c opened outward by the reel-locking spring 44 are urged forward by the sliding spring 45. Thereby, each of the pawl portions 50c 50c of the right and left reel-locking pieces 42, 43 is engaged with the engaging teeth 25d, 26d of the pair of supply side reel 25, and the takeup side reel 26, respectively, to prevent the rotation of both reels 25, 26.

At this time, the reel-locking main body 41 is engaged with the main body guide ribs 35a, 35b, and 37a, 37b provided in the central portion of the back side of the upper shell 23 and the lower shell 24 to be slidable in a front to rear direction. And, the tip side of the connection portion 44c of the reel-locking spring 44 is bent toward the reel-locking main body 41 to press the upper surface of the reel-locking main body 41.

In addition, a pair of reel-locking pieces 42, 43 are engaged with the right and left locking pieces guide ribs 36, 36 provided on both sides of the main body guide ribs 35a, 35b of the lower shell 24, almost parallel to the ribs 35a, 35b, respectively. The inner edge at the front end portion of the right and left locking pieces guide ribs 36 serves as a cam portion 36a inclined outward, and the contacting portions 50h of the reel-locking pieces 42, 43 come in contact with each cam portion 36a, 36a.

In the reel-locking mechanism 40 with the above configuration, the reel-locking main body 41 is urged forward by spring force of the sliding spring 45, and a pair of reel-locking pieces 42, 43 is urged to open outward by spring force of the reel-locking spring 44, when the tape cassette 21 is not used. Then, the pawl portions 50c, 50c of a pair of reel-locking pieces 42, 43 are engaged with the engaging teeth 25d, 26d of the pair of reels 25, 26, respectively. Thereby, rotation of both reels 25, 26 is prevented to produce a reel-locked state where each reel 25, 26 is locked. Therefore, there is no slack in the magnetic tape 30 wound on a pair of reels 25, 26 in a reel-locked state.

At this time, when a tape cassette 21 is loaded to a cassette deck, a reel-unlocking member 48 on the cassette deck shown in FIG. 12 causes a state where the reel-locking main body 41 is guided by the main body guided ribs 35a, 35b, 37a, 37b formed in the upper and lower shells 23, 24, and is slid backward against spring force of the sliding spring 45. As a consequence, since each contacting edge portion 50h slides guided by the cam portion 36a of the locking piece guide rib 36, the pair of reel-locking pieces 42, 43 are made to swing away from both reels 25, 26 against the elasticity of the spring piece 44d (or 44e) of the reel-locking spring 44. As a result, the pawl portions 50c, 50c of the reel-locking pieces 42, 43 come off the engaging teeth 25d, 26d of the reels 25, 26, respectively. Thereby, a pair of reels 25, 26 is released from the reel-locked state, and both reels 25, 26 become possible to rotate.

Then, when the tape cassette 21 is unloaded from the cassette deck, since the reel-unlocking member 48 slides out from the sliding operation portion 41a of the reel-locking main body 41, the reel-locking main body 41 is slid forward by the elasticity of the sliding spring 45. At this time, as shown in FIG. 12, there is provided a large window portion 38 in the upper shell 23, and the main body guide rib 37a is cut off partway by the window portion 38 and a concave portion 39 is formed in the portion cut off.

However, when the reel-locking main body 41 moves forward, there is no possibility that the connection portion 44c of the reel-locking spring 44 may be caught in the concave portion 39, as the tip side of the connection portion 44c of the reel-locking spring 44 is bent toward the reel-locking main body 41 to press the upper surface of the reel-locking main body 41. Therefore, it may be possible to prevent defective operation of the reel-locking main body 41 caused by the fact that the connection portion 44c is caught in the concave portion 39, and smooth and reliable sliding of the reel-locking main body 41 can be secured. Thereby, when a tape cassette 21 is taken out from the cassette deck, the reel-locking operation using the reel-locking mechanism 40 can be smoothly and reliably performed.

Though the present invention is described above, the invention is not limited to the above-mentioned embodiment. For example, in the above-mentioned embodiment, the example where the invention is applied to a consumer tape cassette is described above, but it may be applicable to various kinds of tape cassettes using a magnetic tape as recording medium such as an 8 millimeter video tape cassette, an audio tape cassette, and VHS format and Betamax format tape cassettes, other than the tape cassette described in this embodiment. And, though a compression coil spring is used as a sliding spring, other types of springs including a blade spring may be naturally used, and elastic bodies such as rubber-like elastic body may be, also, used. As mentioned above, the present invention may be subject to various modifications without departing from the scope of the invention.

As described above, according to the present invention, the connection portion of the reel-locking spring is bent toward the reel-locking main body, and the connection portion is pressed against the reel-locking main body by the spring force, and, for example, when a tape cassette is taken out from a cassette deck, it may be possible to eliminate a possibility that the connection portion of the reel-locking spring of the reel-locking mechanism is caught in a concave portion of the upper shell. Therefore, it may be possible to offer a tape cassette with a reel-locking mechanism to perform smooth and reliable reel-locking operation without slack in the magnetic tape.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A tape cassette comprising a pair of reels accommodated between an upper shell and a lower shell which are laid superposed on one another, while a magnetic tape is wound on the reels, and having engaging teeth respectively; a reel-locking main body movable front to rear relative to the pair of reels, and supported on the lower shell; a pair of reel-locking pieces swingably supported on the reel-locking body, and having pawl portions at the tip respectively; and a reel-locking spring having a pair of coil portions loosely engaged with swinging center portions of the pair of reel-locking pieces, and urging the pair of pawl portions toward the pair of reels, respectively; the cassette performing locking and unlocking of the pair of reels through engagement and disengagement of the pair of pawl portions with/from the pair of engaging teeth by movement of said reel-locking main body, wherein a connection portion connecting the pair of coil portions of the reel-locking spring is bent downwardly at a midway portion thereof toward the reel-locking main body to press the reel-locking main body by spring force of the connection portion.

2. A tape cassette according to claim 1, wherein the connection portion extends from the upper portions of the pair of coil portions loosely engaged with the swinging center portions of the pair of reel-locking pieces.

* * * * *